(12) United States Patent
Lagnado et al.

(10) Patent No.: US 11,782,666 B1
(45) Date of Patent: Oct. 10, 2023

(54) AGGREGATE VIEW OF IMAGE INFORMATION ON DISPLAY DEVICES

(71) Applicant: HEWLETT-PACKARD DEVELOPMENT COMPANY, L.P., Spring, TX (US)

(72) Inventors: Isaac Lagnado, Spring, TX (US); Christopher Allan Steven, Spring, TX (US); Andre da Fonte Lopes da Silva, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 45 days.

(21) Appl. No.: 17/659,529

(22) Filed: Apr. 18, 2022

(51) Int. Cl.
*G06T 19/00* (2011.01)
*G06F 3/14* (2006.01)

(52) U.S. Cl.
CPC .......... *G06F 3/1423* (2013.01); *G06T 19/006* (2013.01)

(58) Field of Classification Search
None
See application file for complete search history.

(56) References Cited

U.S. PATENT DOCUMENTS

2022/0398785 A1* 12/2022 Tucker .................... G06T 11/00

OTHER PUBLICATIONS

Irving, Michael, Lenovo AR glasses let you multi-screen virtually anywhere, Jan. 10, 2021 (12 pages).
Takashashi, Dean, Zspace unveils laptop that enables easy AR/VR interaction, Dec. 18, 2018 (7 pages).

* cited by examiner

*Primary Examiner* — Robert J Craddock
(74) *Attorney, Agent, or Firm* — Quarles & Brady LLP (57) ABSTRACT

In some examples, an electronic device includes a first display device and a processor. The processor determines whether the electronic device is paired with a head-mounted device comprising a second display device. In response to determining that the electronic device is paired with the head-mounted device, the processor presents first image information on the first display device, sends second image information to the head-mounted device, and coordinates with the head-mounted device to cause the head-mounted device to display the second image information on the second display device, where the first image information and the second image information are to present an aggregate view to a user of the head-mounted device.

15 Claims, 4 Drawing Sheets

AGGREGATE VIEW OF IMAGE INFORMATION ON DISPLAY DEVICES

BACKGROUND

A head-mounted device refers to an electronic device that can be worn on a user's head. For example, a head-mounted device can include a headset, such as in the form of electronic goggles, in which images can be displayed in front of the user's eyes by respective display devices. In other examples, a head-mounted device can include electronic glasses.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A head-mounted device can include multiple display devices, including a first display device for a right eye of a user, and a second display device for a left eye of the user. In some examples, a head-mounted device can present augmented reality content, in which images of real-world objects are augmented by displayed virtual objects in a virtual environment.

In some cases, a head-mounted device can be communicatively coupled to an external electronic device (e.g., a notebook computer, a desktop computer, a tablet computer, a smartphone, etc.) to use the processing power of the electronic device to generate video streams for presentation in the head-mounted device.

In such arrangements, the images displayed on the display device of the external electronic device are not coordinated with images displayed by the head-mounted device. As a result, display capabilities of the electronic device are not leveraged when the user is wearing the head-mounted device.

In accordance with some implementations of the present disclosure, an electronic device can detect when the electronic device is paired with a head-mounted device, and in response to such detection, is able to separate a video stream into a plurality of layers of image information. The electronic device can control a display of a first layer of image information on the display device of the electronic device, and can coordinate with the head-mounted device to display other layers of the plurality of layers of image information on the display devices of the head-mounted device. As a result, an aggregate view that includes the plurality of layers of image information can be presented to the user when wearing the head-mounted device.

Figure 1:
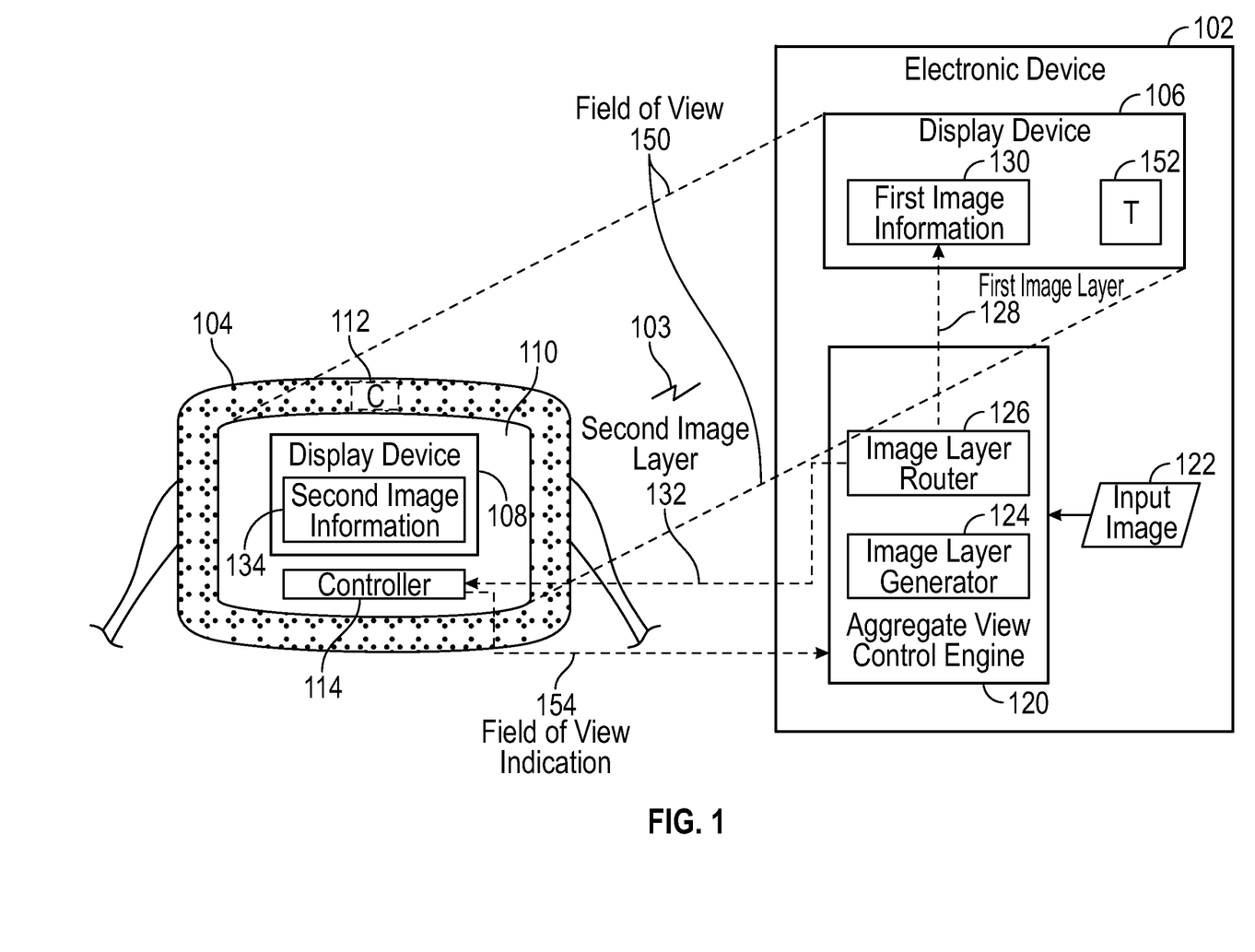
FIG. 1 is a block diagram of an arrangement that includes an electronic device and a head-mounted device that include respective display devices to display respective image information that can be aggregated to present an aggregate view, according to some examples.

FIG. 1 is a block diagram of an example arrangement that includes an electronic device 102 and a head-mounted device 104. The electronic device 102 and the head-mounted device 104 can communicate with one another over a wireless link 103, which can include a BLUETOOTH link, a WI-FI link, a cellular link, and so forth. In other examples, the electronic device 102 and the head-mounted device 104 can communicate with one another over a wired link.

The electronic device 102 can include a notebook computer, a desktop computer, a tablet computer, a smartphone, or any other electronic device that includes a display device 106. In some examples, the display device 106 may be contained in the same housing as processing and other resources of the electronic device 102. In other examples, the display device 106 may be contained in a housing that is separate from a housing that contains processing and other resources of the electronic device 102.

A processing resource can include a processor or multiple processors. A processor (or more specifically, a hardware processor) can include a microprocessor, a core of a multi-core microprocessor, a microcontroller, a programmable integrated circuit, a programmable gate array, or another hardware processing circuit.

Other resources of the electronic device 102 can include a storage resource (e.g., a memory and/or persistent storage), communication resources (e.g., a network interface controller), and so forth.

The head-mounted device 104 can include an electronic goggle, smart glasses, or any other device that can be worn on the head of a user such that the user can view images displayed by a display device (or multiple display devices) of the head-mounted device 104.

As depicted in In FIG. 1, the head-amounted device 104 includes a display device 108. Although a single display device 108 is shown in FIG. 1, the head-mounted device 104 can include multiple display devices in further examples, including a left display device for a left eye of a user, and a right display device for a right eye of the user.

In the ensuing discussion, reference to the display device 108 can refer to a single display device or multiple display devices of the head-mounted device 104.

FIG. 1 provides a rear view the head-mounted device 104. The front of the head-mounted device 104 faces the electronic device 102.

In some examples, the head-mounted device 104 can include a transparent lens 110 that allows outside light to pass through the transparent lens 110 and into a space within the head-mounted device 104 in front of the user's eyes when the user is wearing the head-mounted device 104. A "transparent lens" can refer to any optical layer (or collection of layers) through which light can pass.

The ability to pass light from outside the head-mounted device 104 to the space in front of the user's eyes within the head-mounted device 104 allows for an augmented reality (AR) presentation of images. From the perspective of the head-mounted device 104, the electronic device 102 is part of an external real world that is can be viewed by the user through the transparent lens 110 wearing the head-mounted device 104.

The head-mounted device 104 can present AR content in the display device 108 of the head-mounted device 104. "AR content" can refer to a combination of virtual content to be displayed with real-world content, which in the example of FIG. 1 includes images displayed by the display device 106 of the electronic device 102.

In other examples, images of the external real world can be captured by a front-facing camera 112 of the head-mounted device 104. The front-facing camera 112 faces forwardly (forward of the head-mounted device 104) such that the front-facing camera 112 can capture images of objects in front of the head-mounted device 104. In such examples, the transparent lens 110 can be omitted and replaced with an opaque cover.

Although reference is made to a single front-facing camera 112, in other examples, multiple front-facing cameras can be employed.

The images captured by the front-facing camera 112 can be combined with images to be displayed by the display device 108 of the head-mounted device 104, to present AR content.

The head-mounted device 104 includes a controller 114, which can perform control tasks of the head-mounted device 104. As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

The controller 114 can receive image information to be displayed by the display device 108. For example, the controller 114 can receive image information from the electronic device 102 over the wireless link 103 if the head-mounted device 104 is paired with the electronic device 102. The electronic device 102 and the head-mounted device 104 are "paired" if the electronic device 102 and the head-mounted device 104 are in communication with one another, such as over a short-range wireless connection (e.g., a BLUETOOTH link) over another type of connection (e.g., a WI-FI link, a cellular link, etc.).

The controller 114 can also make a determination of whether the display device 106 of the electronic device 102 is in the field of view of the head-mounted device 104, as indicated by 150 in FIG. 1. The electronic device 102 is in the field of view of the head-mounted device 104 if the display device 106 (or more specifically a display surface of the display device 106 on which images are displayed) is visible either through the transparent lens 110 of the head-mounted device 104 or via the front-facing camera 112.

In some examples, the determination by the controller 114 of whether the display device 106 of the electronic device 102 is in the field of view of the head-mounted device 104 can be based on detecting a trigger 152, which can be displayed by the display device 106 or can be affixed to a front surface of the display device 106. The trigger 152 can be in the form of a mark or any other indicator that can be displayed, or a physical mark or another indicator.

Although a single trigger 152 is shown in FIG. 1, in other examples, multiple triggers 152 can be provided on the display device 106 (e.g., displayed by the display surface of the display device 106 or physically affixed to the display device 106).

The controller 114 can use images captured by the front-facing camera 112 of the head-mounted device 104 to determine if the trigger 152 is present in the images. If so, the controller 114 can further process the images to determine whether the display surface of the display device 106 of the electronic device 102 is within the field of view 150. If so, then the controller 114 can send a field of view indication 154 to the electronic device 102, such as over the wireless link 103. In further examples, a front-facing camera of the electronic device 102 can be used to assist in determining whether the head-mounted device 104 and the electronic device 102 are in a target placement with respect to one another. For example, the electronic device 102 can use artificial intelligence (AI) vision-based to make the determination.

The field of view indication 154 can be in the form of a message, an information element (e.g., a bit or a collection of bits set to a specified value) within a message, or any other information that can be communicated from the head-mounted device 104 to the electronic device 102.

The electronic device 102 includes an aggregate view control engine 120 that responds to the field of view indication 154 by controlling the presentation of images in multiple layers so that the different layers of images can be aggregated to provide an aggregate view, which can be a three-dimensional (3D) view or more generally, can include different images where one image is placed over another image to form a view in which an overall image is based on the combination of the multiple images placed one over another.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The aggregate view control engine 120 receives an input image 122. The input image 122 may be generated inside the electronic device 102, such as by a program executed in the electronic device 102. Alternatively, the input image 122 may be received from a remote source, such as over a network.

The input image 122 is to be displayed in aggregate by the electronic device 102 and the head-mounted device 104. Displaying the input image 122 in "aggregate" can refer to separating the input image 122 into multiple image layers that are respectively displayed on different display devices, such as the display devices 106 and 108 of FIG. 1.

The input image at 122 can be a still image or an image of a video. A video can include a sequence of image frames that are displayed in rapid succession such that a human can perceive motion of an object depicted in the image frames. The input image 122 can include one of the image frames of the video.

The aggregate view control engine 120 can determine whether or not the input image 122 is to be displayed by multiple display devices, including the display device 106 of the electronic device 102 and the display device 108 of the head-mounted device 104. This determination by the aggregate view control engine 120 can be based on whether or not the electronic device 102 is paired with the head-mounted device 104, and whether or not the field of view indication 154 was sent by the head-mounted device 104. If the electronic device 102 is not paired with the head-mounted device 104 or the aggregate view control engine 120 did not receive the field of view indication 154 from the head-mounted device 104, then the aggregate view control engine 120 is not activated, and the electronic device 102 displays the input image 122 on the display device 106 in a normal manner (i.e., not in a manner in which the input image 122 is divided into multiple image layers for producing an aggregate view on multiple display devices).

The aggregate view control engine 120 includes an image layer generator 124 and an image layer router 126. The image layer generator 124 and the image layer router 126 can be implemented using a portion of the hardware processing circuit of the aggregate view control engine 120, or can be implemented using machine-readable instructions executable by the aggregate view control engine 120.

The image layer generator 124 generates, based on the input image 122, multiple layers that are to be displayed by different display devices. For example, the image layer generator 124 can generate, based on the input image 122, a first image layer 128 containing first image information 130 to be displayed by the display device 106 of the electronic device 102, and a second image layer 132 that contains second image information 134 to be displayed by the display device 108 of the head-mounted device 104.

"Image information" can refer to an arrangement of image pixels that collectively form an image.

Once the image layers are generated by the image layer generator 124, the image layer router 126 can route the image layers to respective target display devices for display. For example, each image layer can be associated with target information that identifies where the image layer is to be routed. For example, first target information associated with the first image layer 128 can indicate the display device 106 as the target, in which case the first image layer 128 is routed by the image layer router 126 to the display device 106 (or more specifically, to a graphic controller for the display device 106) to cause display of the first image information 130 in the first image layer 128 on the display device 106. The first target information indicating the display device 106 can include an identifier of the electronic device 102 or any other information that indicates that the first image layer 128 is to be displayed by the electronic device 102.

Similarly, second target information associated with the second image layer 132 can indicate the display device 108 as the target, in which case the second image layer 132 is routed (over the wireless link 103) by the image layer router 126 to the display device 108 (or more specifically, to a graphic controller for the display device 108) to cause display of the second image information 134 in the second image layer 132 on the display device 108. The second target information indicating the display device 108 can include an identifier of the head-mounted device 104 or any other information that indicates that the second image layer 132 is to be displayed by the head-mounted device 104.

In some examples, the image layer generator 124 can divide the input image 122 into multiple image layers for presentation as an over-under (or top and bottom) view. The over-under format includes video content encoded, by the image layer generator 124, in a manner where stacking of the multiple images layers (also referred to as sub-frames) can produce an aggregate view, which can be a 3D view or any other type of aggregate view. For example, the over-under format can be according to the Mandatory Full HD (High Definition) 3D (FHD3D) video format specified by High-Definition Multimedia Interface (HDMI) 1.4, or other versions of HDMI. In other examples, the image layer generator 124 can divide the input image 122 into multiple image layers according to other formats.

If the over-under format is used, then the image layer generator 124 generates a top image layer for display by the head-mounted device 104, and a bottom image layer for display by the display device 106 of the electronic device 102. The top image layer can further be divided into a left eye portion and a right eye portion, to be displayed on the left display device and the right display device, respectively, of the head-mounted device 104 in examples where the head-mounted device 104 includes left and right display devices.

In some examples, an aggregate view of the first image information 130 and the second image information 134 displayed by respective display devices 106 and 108 can be a 3D view, where the 3D effect is due to the stacking of the first image information 130 and the second image information 134. The first image information 130 can be visible to the user wearing the head-mounted device 104 through the transparent lens 110, or alternatively, the first image information 130 can be captured by the front-facing camera 112 of the head-mounted device 104 and combined with the second image information 134 on the display device 108 to form AR content.

In other examples, the first and second image layers 128 and 132 can be used for secure depiction of sensitive information. For example, the input image 122 can include sensitive information, such as confidential information of an individual or enterprise, or any other information which a user does not wish to be shared with others. In such cases, the aggregate view control engine 120, in response to the pairing of the electronic device 102 and the head-mounted device 104 and receipt of the field of view indication 154, can produce the first image layer 128 and the second image layer 132 such that the sensitive information (foreground information) is included in the second image layer 132, and blank or background information is included in the first image layer 128.

In further examples, the first and second image layers 128 and 132 can include video game images, where the first image layer 128 for display at the electronic device 102 can include background images of a video game, while the second image layer 132 for display at the head-mounted device 104 can include foreground objects, such as objects to be manipulated by a human video game player.

Figure 2:
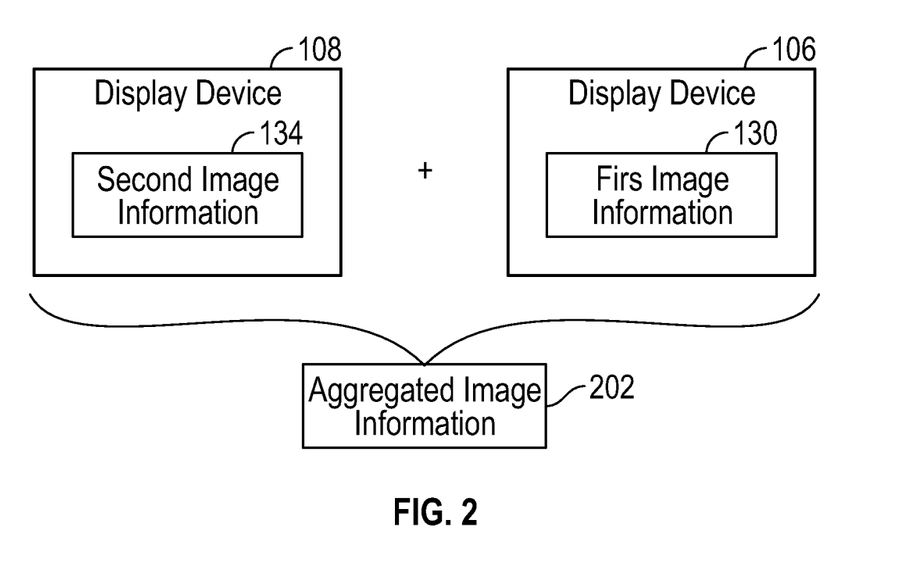
FIG. 2 is a schematic view of aggregating image information displayed on different display devices, according to some examples.

FIG. 2 illustrates an example of aggregating the second image information 134 with the first image information 130 into aggregated image information 202, based on stacking the second image information 134 over the first image information 130. For example, the aggregated image information 202 can include AR content output at the display device 108 of the head-mounted device 104 based on combining the first image information 130 and the second image information 134.

Figure 3:
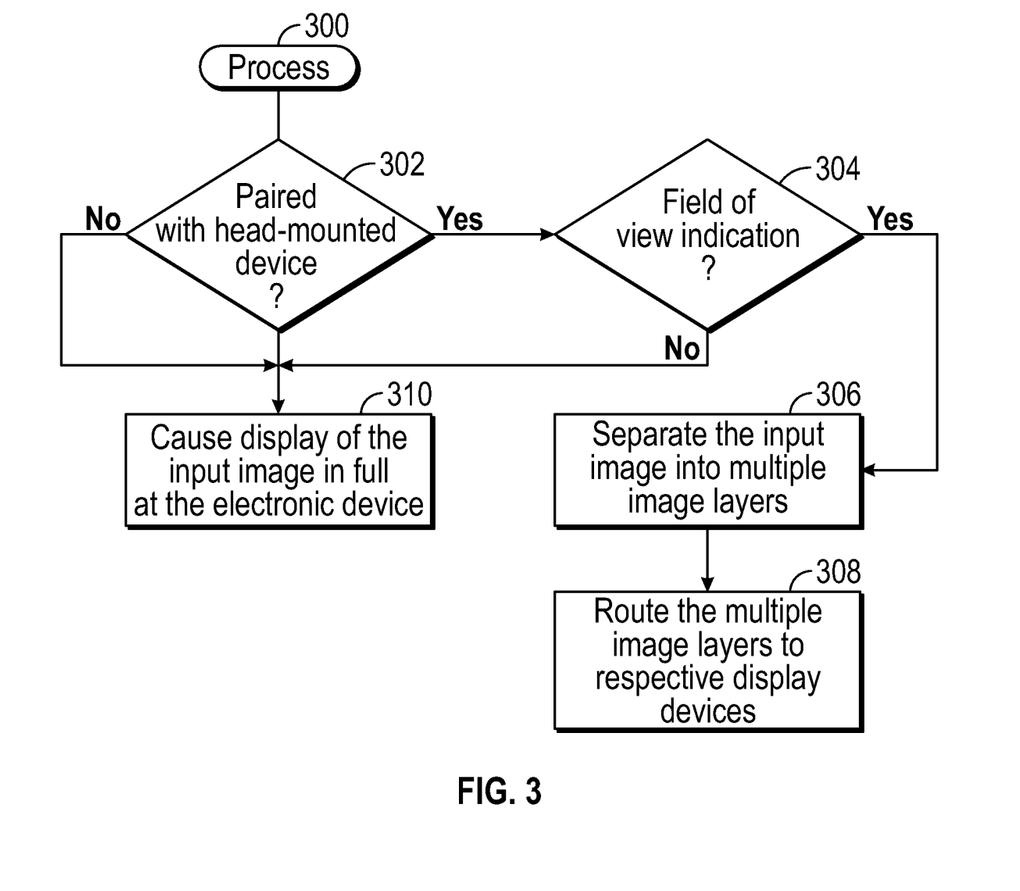
FIG. 3 is a flow diagram of a process according to some examples.

FIG. 3 is a flow diagram of a process 300, which can be performed by the aggregate view control engine 120 in the electronic device 102.

The process 300 determines (at 302) whether the electronic device 102 is paired with the head-mounted device 104. If so, the process 300 determines (at 304) whether the field of view indication 154 was received from the head-mounted device 104 indicating that the display device 106 is in the field of view 150 of the head-mounted device 104.

If either the electronic device 102 is not paired with the head-mounted device 104, or the field of view indication 154 was not received, then the process 300 causes (at 310) display of the input image in full at the electronic device 102.

If the electronic device 102 is paired with the head-mounted device 104 and the field of view indication 154 was received from the head-mounted device 104, the aggregate view control engine 120 separates (at 306) the input image into multiple image layers, as performed by the image layer generator 124. Moreover, the image layer router 126 routes (at 308) the multiple image layers to respective display devices to cause image information in the multiple image layers to be displayed by different display devices.

Figure 4:
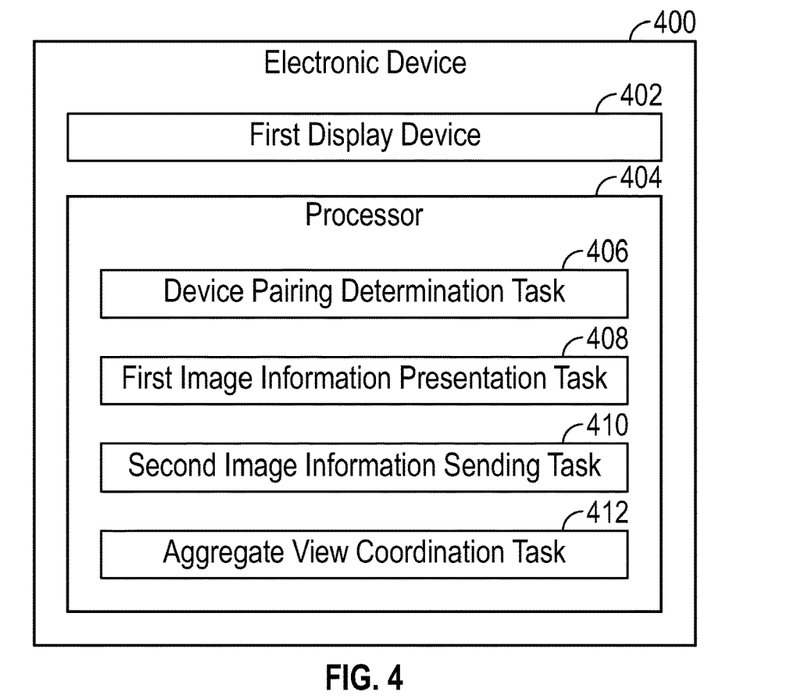
FIG. 4 is a block diagram of an electronic device according to some examples.

FIG. 4 is a block diagram of an electronic device 400 according to some examples of the present disclosure. The electronic device 400 includes a first display device 402 and a processor 404 to perform various tasks. A processor performing a task can refer to a single hardware processor performing the task or multiple hardware processors performing the task.

The tasks of the processor 404 include a device pairing determination task 406 to determine whether the electronic device is paired with a head-mounted device that has a second display device.

The tasks of the processor 404 include tasks 408, 410, and 412 performed in response to determining that the electronic device is paired with the head-mounted device. The first image information presentation task 408 presents first image information on the first display device 402.

The second image information sending task 410 sends second image information to the head-mounted device.

The aggregate view coordination task 412 coordinates with the head-mounted device to cause the head-mounted device to display the second image information on the second display device, where the first image information and the second image information are to present an aggregate view to a user of the head-mounted device. For example, the coordination can be associated with displaying over-under image content to produce an aggregate view.

In some examples, the processor 404 receives an input image, which can be a still image or can be part of a video. The processor 404 separates the input image into a plurality of image layers including a first image layer having the first image information, and a second image layer having the second image information.

In some examples, the processor 404 receives an indication from the head-mounted device that the first display device 402 is within a field of view of a front portion of the head-mounted device. The sending of the second image information to the head-mounted device, and the coordinating with the head-mounted device to cause the head-mounted device to display the second image information on the second display device are performed in response to receiving the indication.

In some examples, the indication is based on sensing by a front-facing camera of the head-mounted device that the first display device is within the field of view of the front portion of the head-mounted device.

Figure 5:
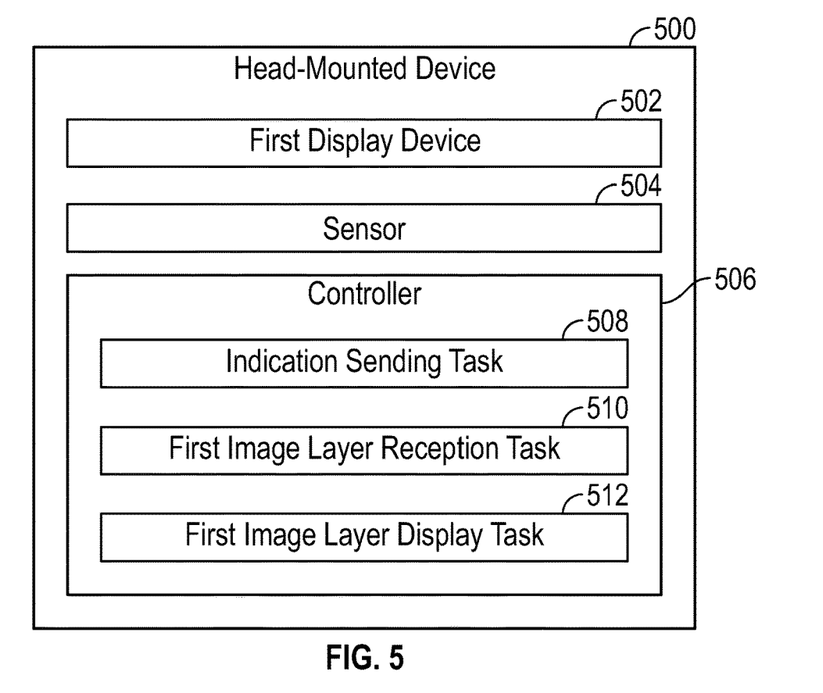
FIG. 5 is a block diagram of a head-mounted device according to some examples.

FIG. 5 is a block diagram of a head-mounted device 500 including a first display device 502 and a sensor 504 to detect a second display device of an electronic device that is external of the head-mounted device 500. The sensor 504 can include a camera (e.g., the front-facing camera 112 of FIG. 1) or another type of sensor.

The head-mounted device 500 includes a controller 506 to perform various tasks. The tasks of the controller 506 include an indication sending task 508 to send, to the electronic device, an indication of the detection of the second display device of the electronic device by the sensor 504 of the head-mounted device 500.

The tasks of the controller 506 include a first image layer reception task 510 to receive a first layer of image information from the electronic device, the first layer of image information sent by the electronic device responsive to the indication.

The tasks of the controller 506 include a first image layer display task 512 to display the first layer of image information in the first display device 502 of the head-mounted device 500, where the first layer of image information is part of an aggregate view that further includes a second layer of image information displayed on the second display device of the electronic device.

In some examples, the aggregative view includes an augmented reality presentation that includes the first layer of image information and the second layer of image information combined together.

In some examples, coordination of the display of the first layer of image information and the second layer of image information is controlled by the electronic device.

Figure 6:
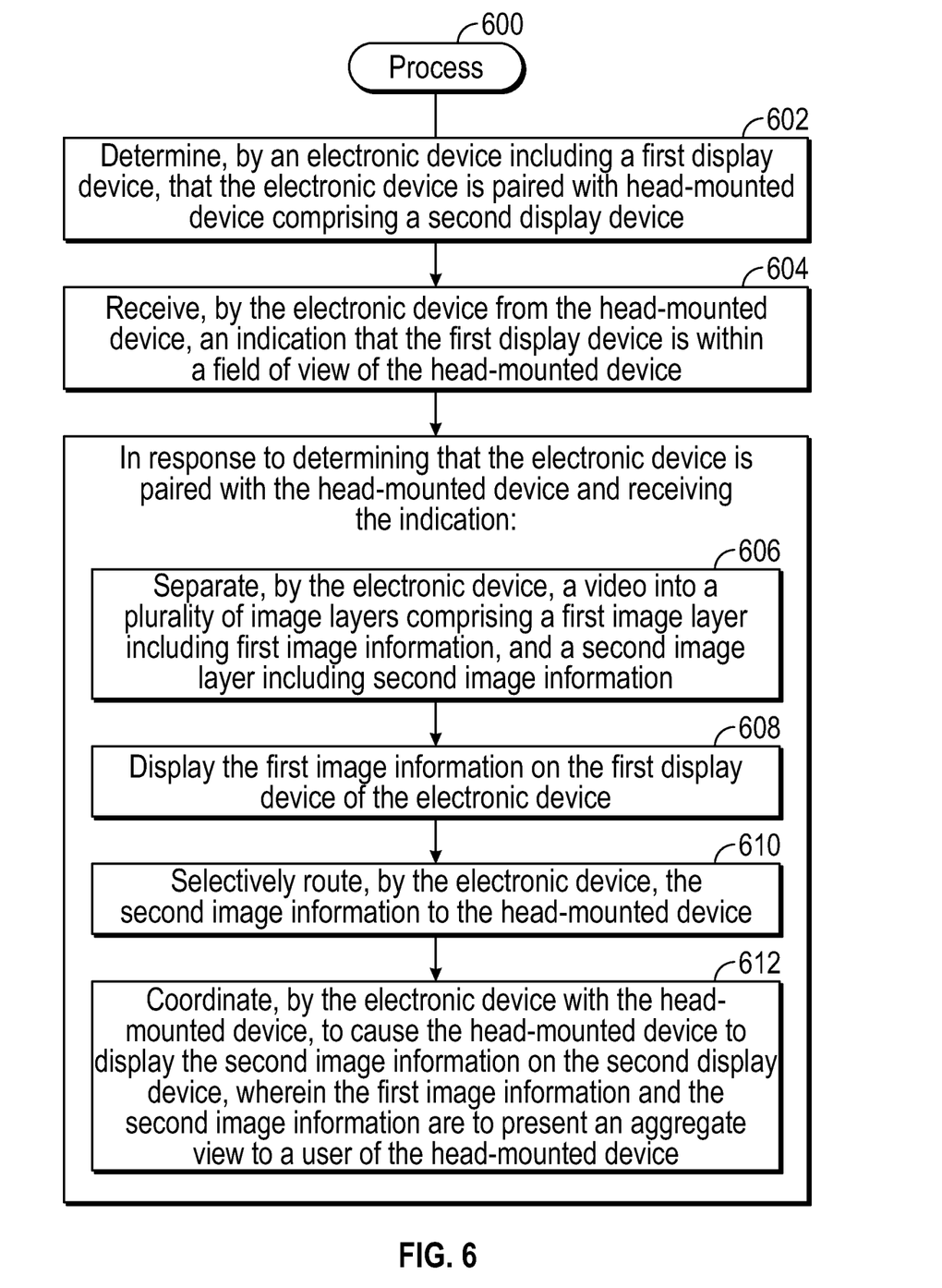
FIG. 6 is a flow diagram of a process according to some examples.

FIG. 6 is a flow diagram of a process 600, which can be performed by the electronic device 102 of FIG. 1, for example.

The process 600 includes determining (at 602), by an electronic device including a first display device, that the electronic device is paired with a head-mounted device comprising a second display device.

The process 600 includes receiving (at 604), by the electronic device from the head-mounted device, an indication that the first display device is within a field of view of the head-mounted device.

The process 600 performs tasks 606, 608, 610, and 614 in response to determining that the electronic device is paired with the head-mounted device and receiving the indication.

The process 600 includes separating (at 606), by the electronic device, a video into a plurality of image layers comprising a first image layer including first image information, and a second image layer including second image information.

The process 600 includes displaying (at 608) the first image information on the first display device of the electronic device.

The process 600 includes selectively routing (at 610), by the electronic device, the second image information to the head-mounted device.

The process 600 includes coordinating (at 612), by the electronic device with the head-mounted device, to cause the head-mounted device to display the second image information on the second display device, wherein the first image information and the second image information are to present an aggregate view to a user of the head-mounted device.

A non-transitory machine-readable or computer-readable storage medium can store machine-readable instructions, such as those of the aggregate view control engine 120 or instructions to perform the tasks of FIGS. 3-5. The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
   a first display device;
   a processor to:
   determine whether the electronic device is paired with a head-mounted device comprising a second display device;
   in response to determining that the electronic device is paired with the head-mounted device:
   present first image information on the first display device,
   send second image information to the head-mounted device, and
   coordinate with the head-mounted device to cause the head-mounted device to display the second image information on the second display device, wherein the first image information and the second image information are to present an aggregate view to a user of the head-mounted device.

2. The electronic device of claim 1, wherein the processor is to:
   separate an input image into the first image information and the second image information; and
   in response to determining that the electronic device is not paired with the head-mounted device, present the input image in full on the first display device of the electronic device.

3. The electronic device of claim 1, wherein the processor is to:
   receive a video; and
   separate the video into a plurality of image layers comprising a first image layer including the first image information, and a second image layer including the second image information.

4. The electronic device of claim 3, wherein the processor is to:
   selectively route the first image layer for display on the first display device of the electronic device; and
   selectively route the second image layer for display on second display device of the head-mounted device.

5. The electronic device of claim 1, wherein the processor is to:
   receive an indication from the head-mounted device that the first display device is within a field of view of a front portion of the head-mounted device,
   wherein the sending of the second image information to the head-mounted device, and the coordinating with the head-mounted device to cause the head-mounted device to display the second image information on the second display device are performed in response to receiving the indication.

6. The electronic device of claim 5, wherein the indication is based on sensing by a front-facing camera of the head-mounted device that the first display device is within the field of view of the front portion of the head-mounted device.

7. The electronic device of claim 6, wherein the indication is based on capture by the front-facing camera of the head-mounted device of a trigger displayed by the first display device of the electronic device.

8. The electronic device of claim 1, wherein the first image information displayed on the first display device of the electronic device is visible through a front portion of the head-mounted device.

9. The electronic device of claim 1, wherein the aggregate view comprising the first image information and the second image information comprises an augmented reality presentation.

10. The electronic device of claim 1, wherein the head-mounted device further has a third display device, and the processor is to further:
    send third image information to the head-mounted device, and
    coordinate with the head-mounted device to cause the head-mounted device to display the second image information on the second display device and the third image information on the third display device, wherein the first image information, the second image information, and the third image information provide the aggregate view to the user of the head-mounted device.

11. A head-mounted device comprising:
    a first display device;
    a sensor to detect a second display device of an electronic device that is external of the head-mounted device; and
    a controller to:
    send, to the electronic device, an indication of the detection of the second display device of the electronic device,
    receive a first layer of image information from the electronic device, the first layer of image information sent by the electronic device responsive to the indication, and
    display the first layer of image information in the first display device of the head-mounted device, wherein the first layer of image information is part of an aggregate view that further includes a second layer of image information displayed on the second display device of the electronic device.

12. The head-mounted device of claim 11, wherein the aggregative view comprises an augmented reality presentation that comprises the first layer of image information and the second layer of image information.

13. The head-mounted device of claim 11, wherein coordination of the display of the first layer of image information and the second layer of image information is controlled by the electronic device.

14. A method comprising:
- determining, by an electronic device comprising a first display device, that the electronic device is paired with a head-mounted device comprising a second display device;
- receiving, by the electronic device from the head-mounted device, an indication that the first display device is within a field of view of the head-mounted device; and
- in response to determining that the electronic device is paired with the head-mounted device and receiving the indication:
  - separating, by the electronic device, a video into a plurality of image layers comprising a first image layer including first image information, and a second image layer including second image information,
  - displaying the first image information on the first display device of the electronic device,
  - selectively routing, by the electronic device, the second image information to the head-mounted device, and
  - coordinating, by the electronic device with the head-mounted device, to cause the head-mounted device to display the second image information on the second display device, wherein the first image information and the second image information are to present an aggregate view to a user of the head-mounted device.

15. The method of claim 14, wherein the second image layer including the second image information comprises a security layer that is displayed in the head-mounted device to avoid the second image information being visible on the first display device.

\* \* \* \* \*